Patented Nov. 28, 1939

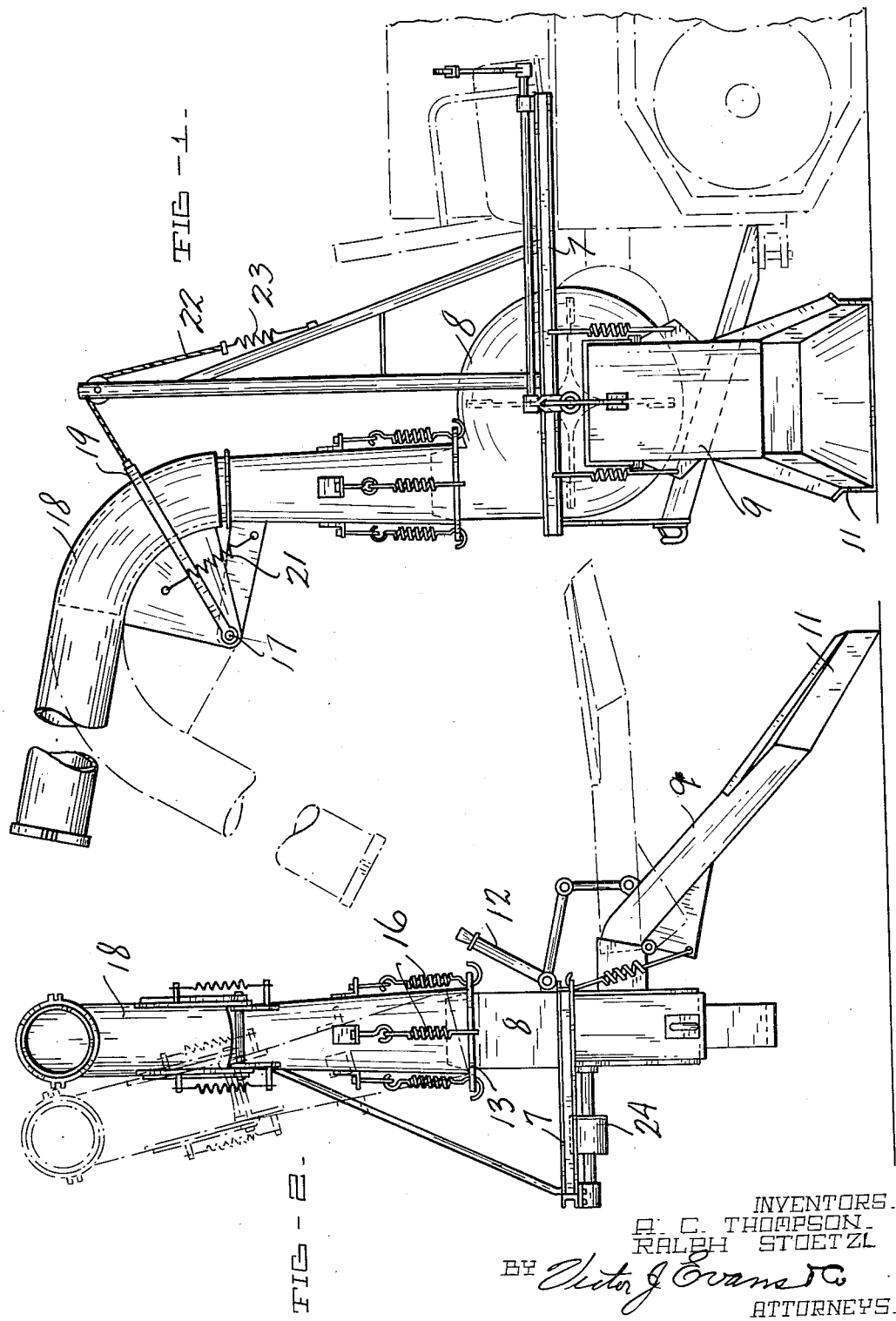

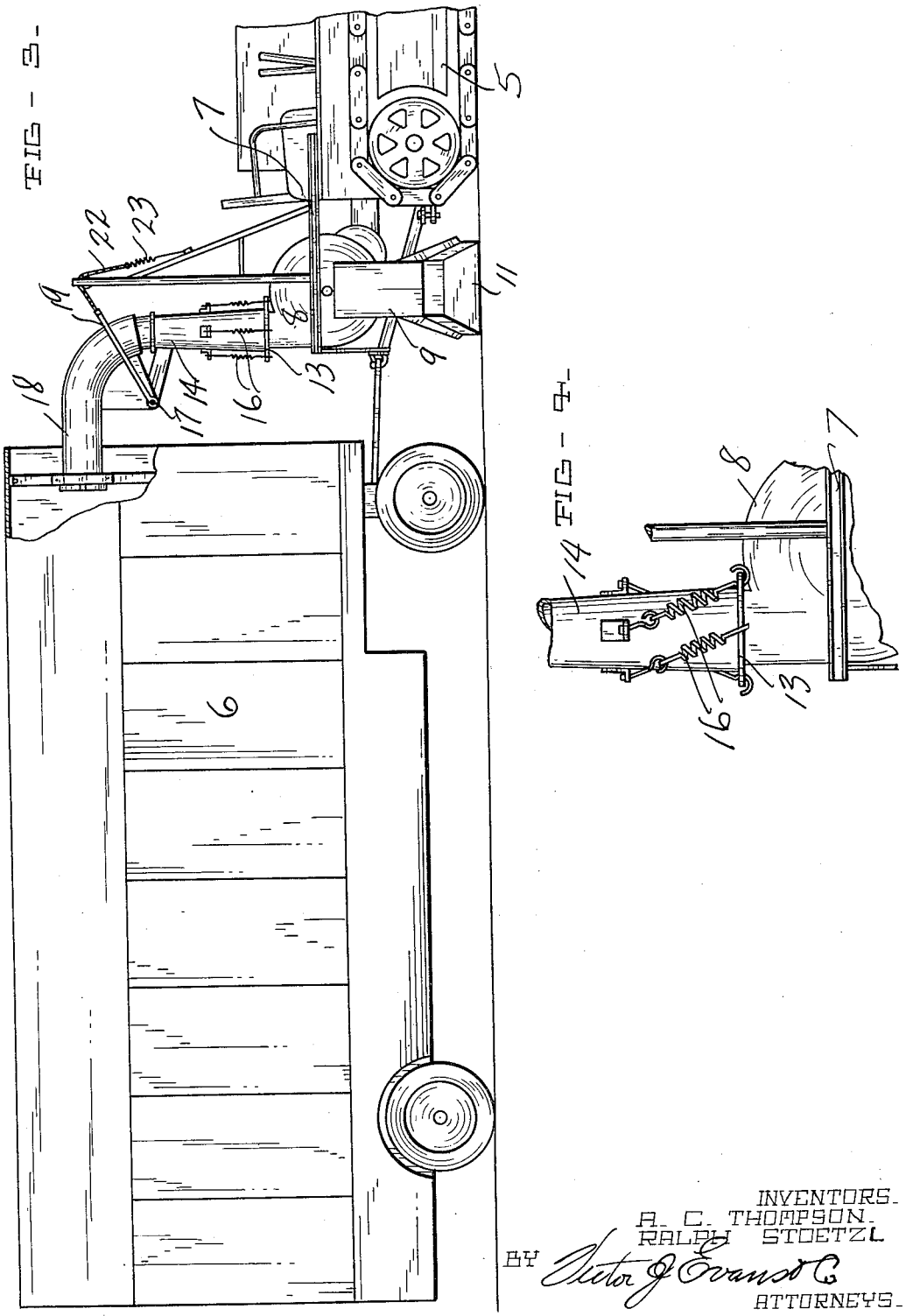

2,181,795

UNITED STATES PATENT OFFICE 2,181,795

LOADING DEVICE

Andrew C. Thompson and Ralph Stoetzl, Madera, Calif.

Application October 14, 1938, Serial No. 235,041

3 Claims. (Cl. 302—17)

This invention relates to improvements in loading devices, and has particular reference to a device for loading material from the ground to an elevated position.

The principal object of this invention is to elevate chaff or other similar material into a storage receptacle or vehicle as the device is moving over the ground.

A further object of the invention is to produce a device of this character which may be attached to a tractor without materially altering the construction thereof, and a device which may be economically operated by a single operator.

Other objects and advantages will be apparent during the course of the following description.

In the accompanying drawings forming a part of this specification and in which like numerals are employed to designate like parts throughout the same, Fig. 1 is a side elevation of our device;

Fig. 2 is a rear elevation of Fig. 1;

Fig. 3 is a side elevation of our device as the same would appear in use attached to a tractor or discharging into a vehicle; and Fig. 4 is a fragmentary detail view of the manner in which the delivery stack may be rotated.

In the thrashing of wheat or other grains, the refuse or chaff is ordinarily left in piles upon the ground and has to be removed usually by shovelling into a vehicle, which is a tedious process.

We have, therefore, devised an arrangement for elevating this chaff through mechanical power.

In the accompanying drawings wherein for the purpose of illustration is shown a preferred embodiment of our invention, the numeral 5 designates a tractor and the numeral 6 a vehicle that is drawn by the tractor and into which the chaff is discharged.

Our device is suspended from the tractor by a framework 7 and is so positioned as to be between the tractor and the vehicle. Mounted on the frame 7 is a blower which is mounted within the casing 8. A chute 9 connects to the casing 8 and has a pan 11 into which the chaff is shovelled. This chute 9 and pan 11 may be elevated through the medium of a lever 12, (see Fig. 2) the elevated position being shown in dotted lines. The casing 8 is provided with a discharge pipe and below the upper end thereof is provided a rigid collar 13 and resting upon this collar is a stack 14, which stack is held in place by a plurality of springs 16. This arrangement permits the stack to rotate as shown in Fig. 4, or to tip as shown in dotted lines in Fig. 2. To the upper end of the stack we pivot, as at 17, a goose neck discharge pipe 18, which goose neck is supported by a yoke 19 and normally held in the full line position of Fig. 1 by a spring 21, while the yoke 19 is connected through the medium of a cable 22 to a spring 23. The free end of the goose neck 18 may discharge in any direction, as shown in dotted lines in Fig. 1, or into the wagon 6, as shown in Fig. 3. A pulley 24 driven by a belt from the tractor 5 operates the blower in the casing 8.

It will thus be apparent that when our device is in operation and the blower is rotating, suction will cause chaff moved into the pan 11 to travel up the chute 9, thence through the blower into the stack 14 from which it will be discharged into the goose neck 18 and thence into the receptacle provided therefor.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:

1. In a device of the character described, a suspended frame, a blower mounted on said frame, means for discharging material to said blower, a collar mounted on the outlet from said blower, a stack positioned on said collar, a series of springs secured to and arranged around the outer edge of said collar and having their upper ends secured to the stack, whereby said stack may oscillate and tip, and a goose neck discharge pipe pivotally connected to the discharge end of said stack, spring means for supporting said goose neck with relation to said stack.

2. In a device of the character described, a frame adapted to be attached to a motor vehicle, a blower mounted on said frame, means for feeding material to the lower end of the blower, an outlet carried by the upper end of the blower, a collar rigidly carried by the outlet below its upper end, a stack surrounding the outlet and resting on the collar, a series of springs secured to and arranged around the outer edge of the collar and having their upper ends secured to the stack, a goose neck discharge pipe surrounding the upper end of the stack and pivotally connected thereto, and spring means for supporting said goose neck.

3. In a device of the character described, a frame adapted to be attached to a motor vehicle, a blower mounted on said frame, means for feeding material to the lower end of the blower, an outlet carried by the upper end of the blower, a collar rigidly carried by the outlet below its upper end, a stack surrounding the outlet and resting on the collar, a series of springs secured to and arranged around the outer edge of the collar and having their upper ends secured to the stack, a goose neck discharge pipe surrounding the upper end of the stack, a standard carried by the frame, a yoke connected to the goose neck, and a cable connected to the yoke and passing over the pulley carried by the standard and having a spring connection with said standard.

ANDREW C. THOMPSON.
RALPH STOETZL.